United States Patent
Pettersson et al.

(10) Patent No.: US 6,902,361 B2
(45) Date of Patent: Jun. 7, 2005

(54) FIXATION DEVICE FOR A PORTABLE ORBITAL DRILLING UNIT

(75) Inventors: Bjorn Pettersson, Jarfalla (SE); Marcus Wiklund, Lycuselevägen (SE)

(73) Assignee: Novator AB, Spanga (SE)

(*) Notice: Subject to any disclaimer, the term of this patent is extended or adjusted under 35 U.S.C. 154(b) by 0 days.

(21) Appl. No.: 10/172,541

(22) Filed: Jun. 14, 2002

(65) Prior Publication Data
US 2003/0049085 A1 Mar. 13, 2003

Related U.S. Application Data

(60) Provisional application No. 60/299,007, filed on Jun. 18, 2001.

(51) Int. Cl.$^7$ .................................................. B23C 1/20
(52) U.S. Cl. ..................... 409/178; 409/143; 409/200; 409/191; 409/130; 144/154.5; 144/136.95; 144/144.52; 144/144.1; 408/97; 408/98
(58) Field of Search ................................. 409/175, 178, 409/179, 182, 180, 130, 131–132, 74, 143, 200, 191, 137; 144/154.5, 136.95, 371–372, 144.51, 144.52, 144.1; 451/344, 357, 358, 237; 408/95, 97, 98

(56) References Cited

U.S. PATENT DOCUMENTS

| | | | | |
|---|---|---|---|---|
| 2,882,762 A | * | 4/1959 | Stratman et al. | 408/3 |
| 3,339,435 A | * | 9/1967 | Heitz | 408/67 |
| 3,575,519 A | * | 4/1971 | Bruner et al. | 408/97 |
| 3,620,636 A | * | 11/1971 | Godard | 408/141 |
| 4,125,057 A | * | 11/1978 | Cox | 409/143 |
| 4,143,691 A | * | 3/1979 | Robinson | 409/182 |
| 4,507,026 A | * | 3/1985 | Lund | 408/97 |
| 4,557,646 A | * | 12/1985 | Biek | 409/218 |
| 4,588,334 A | * | 5/1986 | Khurana | 408/241 G |
| 4,599,018 A | * | 7/1986 | Woods | 409/178 |
| 4,668,134 A | * | 5/1987 | Vindez | 408/97 |
| 4,770,570 A | * | 9/1988 | Tsui et al. | 408/61 |
| 4,841,817 A | * | 6/1989 | Tsui et al. | 408/61 |
| 4,850,755 A | * | 7/1989 | Spencer | 408/56 |
| 4,921,375 A | * | 5/1990 | Famulari | 408/67 |
| 5,054,968 A | * | 10/1991 | Eckman | 408/97 |
| 5,088,171 A | * | 2/1992 | Suzuki | 29/26 A |
| 5,117,879 A | * | 6/1992 | Payne | 409/182 |
| 5,161,923 A | * | 11/1992 | Reccius | 408/72 R |
| 5,285,598 A | * | 2/1994 | Arita et al. | 451/41 |
| 5,372,464 A | * | 12/1994 | Bureller | 408/72 B |
| 5,641,252 A | | 6/1997 | Eriksson et al. | 409/132 |
| 5,688,082 A | * | 11/1997 | Richardson | 409/137 |
| 6,382,890 B1 | | 5/2002 | Linderholm | 409/191 |

FOREIGN PATENT DOCUMENTS

| | | | |
|---|---|---|---|
| FR | 2302166 A | * | 10/1976 |
| FR | 2562179 A | * | 10/1985 |
| WO | WO-94/17944 A1 | * | 8/1994 |
| WO | WO-01/15870 A2 | * | 3/2001 |

\* cited by examiner

Primary Examiner—Erica Cadugan
(74) Attorney, Agent, or Firm—Taylor & Aust, P.C.

(57) ABSTRACT

A fixation device for positioning a rotating machine tool onto a template, the template having at least one hole and at least one locating pin. The fixation device includes a housing with a housing tool end and a housing template end, a seat located on the housing tool end for coupling with the rotating machine tool, and a clamping mechanism disposed at least partially at the housing template end for coupling with at least one locating pin.

4 Claims, 2 Drawing Sheets

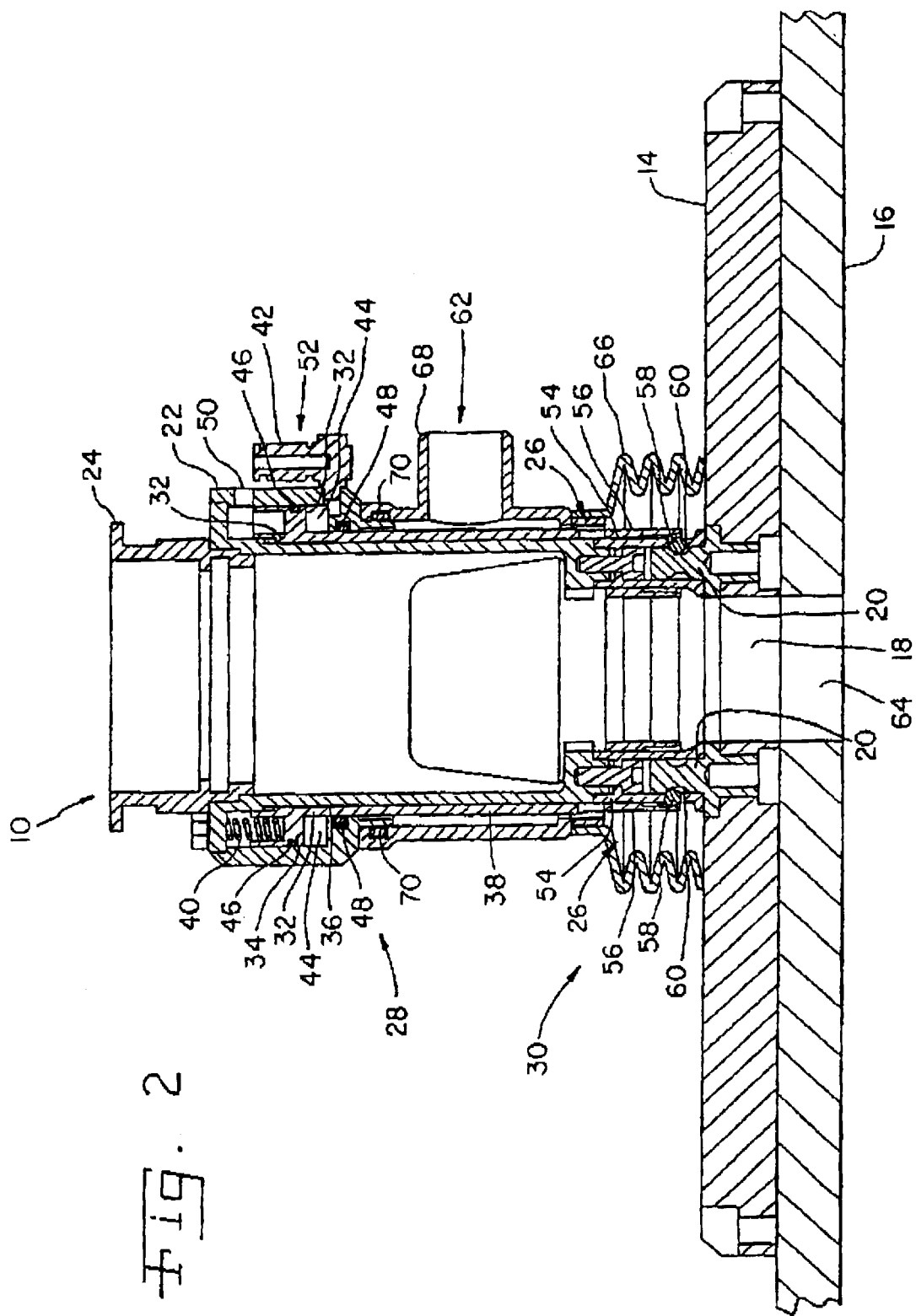

FIXATION DEVICE FOR A PORTABLE ORBITAL DRILLING UNIT

CROSS REFERENCE TO RELATED APPLICATIONS

This is a non-provisional application which claims priority under 35 U.S.C. § 120 U.S. provisional patent application Ser. No. 60/299,007, entitled "FIXATION DEVICE FOR A PORTABLE ORBITAL DRILLING UNIT", filed Jun. 18, 2001.

BACKGROUND OF THE INVENTION

1. Field of the Invention

The present invention relates to a fixation device for mounting a hand tool to a drill template when cutting a hole in an object, and, more particularly, a fixation device used with a drill template and a hand tool for cutting a hole that has a larger diameter than the diameter of the cutting tool.

2. Description of the Related Art

When machining materials using a portable or hand tool, many advantages are achieved due to the flexible positioning of the tool and degrees of freedom of motion of the tool with respect to the workpiece. The advantages of using a portable or hand tool include the ability to position the tool in positions not allowed by a stationary tool, overhead for example, or to position the tool and machine a workpiece that is part of a larger assembly, such as may occur during a repair operation. Machining a workpiece with a curved (or other non flat geometry) surface can be made easier with a portable or hand tool due to the inherent positioning flexibility.

Additionally, templates are used in conjunction with machine tools to easily replicate a workpiece pattern. When using templates the machine tool is guided by the template pattern requiring the motion of the machine tool to be constrained by the template pattern. The use of a template with a portable or hand tool can be problematic due to the inherent positioning flexibility and degrees of freedom of motion of the tool which now must be constrained to follow the template pattern.

U.S. Pat. No. 5,641,252 (Eriksson et al.) discloses a method for machining holes in a fiber reinforced composite material by using at least one cutting tool with wear resistant surface positioned eccentrically in relation to a central axis. The material is machined simultaneously in both an axial and a radial direction by causing the tool to move axially while rotating not only about its own axis, but also eccentrically about the central axis. In accordance with one feature of the invention, the workpiece is oriented in such a way that the axis of rotation of the tool is essentially orthogonal in relation to the longitudinal directions of the fibers in the immediate vicinity of the point where the tool meets the working surface. The diameter of the cutting tool is substantially smaller than the diameter of the hole that is produced. The eccentric rotary motion is generally a strictly rotary motion, i.e., it is executed with a constant distance between the central axis and the axis of rotation of the cutting tool. This distance between the central axis and the axis of rotation of the cutting tool can be increased by linear increments as the eccentric rotary motion continues.

This known method has a number of substantial advantages as compared with generally familiar techniques. For example, the method permits the production of holes without strength reducing damage. Also, the method permits the production of holes free from damage without having to preform a hole. Further, the method permits the production of holes to tight tolerances. The dimensional accuracy of the hole is determined substantially by the accuracy of the positioning of the tool relative to the central axis. The requirements imposed on the geometry of the cutting tool are not particularly high, on the other hand, since every individual tool is simply calibrated before use. Additionally, the method prevents the tool from becoming blocked. Since the diameter of the tool is substantially smaller than that of the hole, the method permits material removed by cutting to be carried away by simple means, such as with compressed air. The method also permits effective cooling of the tool and the edge of the hole. Yet another advantage is that the method substantially reduces the cost of wear compared to previously disclosed methods, due to the tool being coated with a wear resistant material, such as diamond coating. Moreover, this method also offers advantages when machining other materials such as metals.

U.S. Pat. No. 6,382,890 (Linderholm) discloses a hand tool apparatus using a cutting tool to machine a hole in an object such that the hole has a width at least as large as the width of the cutting tool. The center line of the hole passes through a predetermined point on the surface of the object. Moreover, the disclosed invention provides a compact and lightweight hand tool apparatus for machining holes in a flat or curved object of any material by rotating a cutting tool about its own axis and about a principal axis while simultaneously feeding in the axial direction. A lightweight and compact apparatus is achieved by integrating a radial offset mechanism, spindle motor and axial feed mechanism in a same actuating assembly package, which rotates about a principal axis.

Template machining is well known in the art when using a machine tool to replicate an object or pattern in a workpiece. A template is used to consistently guide a machine tool during the machining operation and thereby simplify the process. A hand tool apparatus as disclosed in U.S. Pat. No. 6,382,890 (Linderholm) has advantages over a fixed machine tool in terms of flexibility and more degrees of freedom in motion and positioning; however, these same advantages can create difficulty in maintaining the proper orientation of the hand tool apparatus with respect to the template and workpiece during the machining operation. This difficulty may be particularly evident during an orbital drilling process when the tool is subjected to both an axial force and a radial force through the cutting tool tip by virtue of machining simultaneously in both an axial and radial direction.

What is needed in the art is a method and device for maintaining the orientation of a hand tool apparatus with respect to the template and during the machining process.

SUMMARY OF THE INVENTION

The present invention provides a method and device for fixing the orientation of a rotating machine tool with respect to a machining template.

The invention comprises, in one form thereof, a fixation device for positioning a rotating machine tool onto a template, the template having at least one hole and at least one locating pin. The fixation device includes a housing with a housing tool end and a housing template end, a seat located on the housing tool end for coupling with the rotating machine tool, and a clamping mechanism disposed at least partially at the housing template end for coupling with at least one locating pin.

An advantage of the present invention is that the fixation device maintains the orientation of a rotating machine tool with respect to the workpiece during the machining process.

Another advantage of the present invention is that the fixation device is easily released from the template.

Yet another advantage of the present invention is the ability of the fixation device to remove and exhaust machining debris from the machining area during the machining process.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings wherein:

FIG. 2 is a sectional view taken along section line 2—2 in FIG. 1 showing only an embodiment of the fixation device, a machining template and a workpiece.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
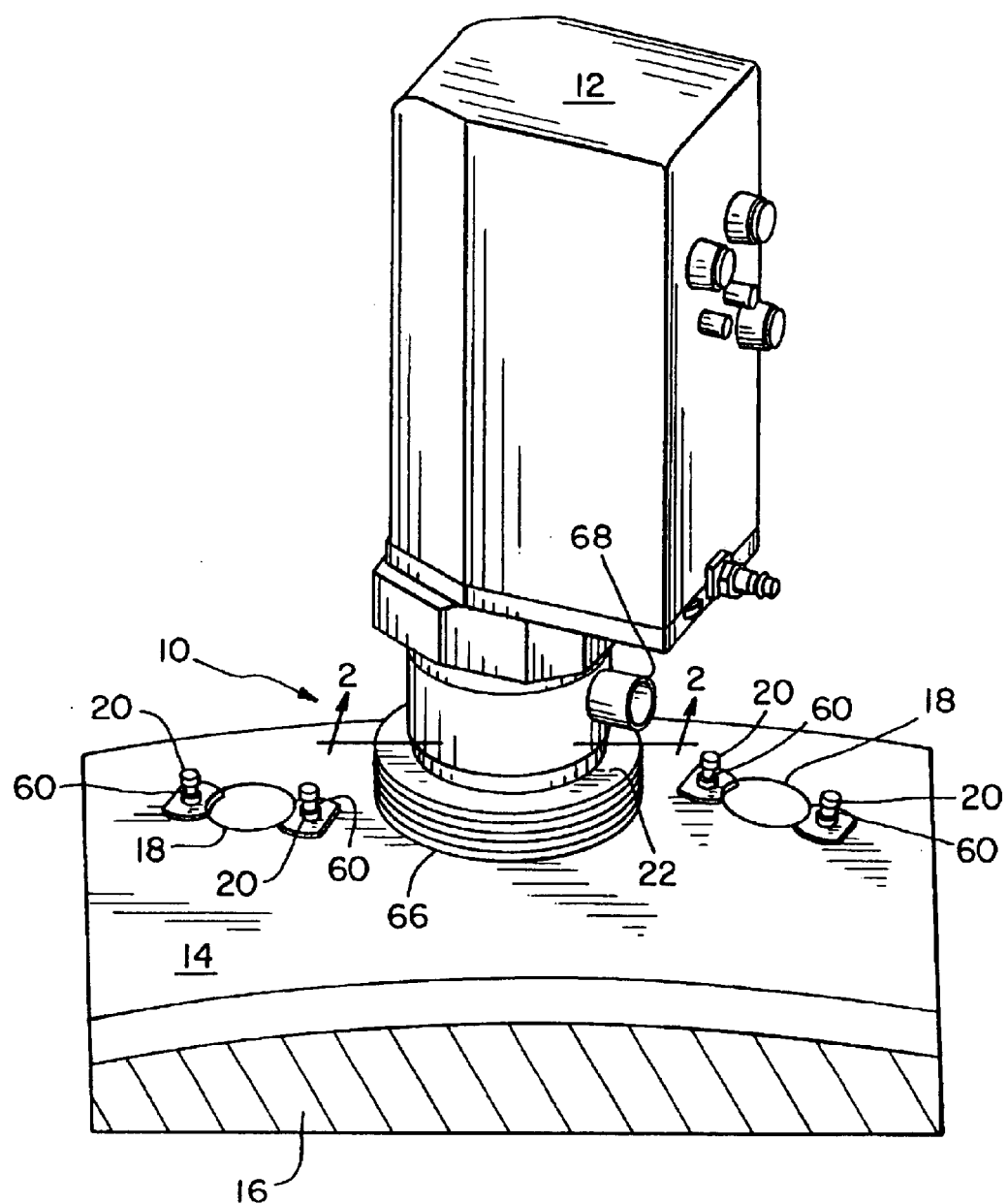
FIG. 1 is perspective view of an embodiment of a fixation device of the present invention with a rotating machine tool mounted therein and shown clamped to a machining template with workpiece.

Referring now to the drawings, and more particularly to FIG. 1, there is shown a fixation device 10 of the present invention with a rotating machine tool 12 mounted on and therein and shown clamped to a machining template 14 with workpiece 16.

Workpiece 16 may be made of a composite material, such as a fiber-reinforced composite material, or alternatively, may be of metal composition including alloys or a combined metal and composite makeup. Workpiece 16 may be flat or have curved surfaces or other surface geometries. Machining area 64 in workpiece 16 may be a hole or other geometries as dictated by workpiece 16 form, fit, function and/or design.

Rotating machine tool 12 is shown as a portable orbital drilling unit; alternatively, rotating machine tool 12 can be a grinding tool, a milling tool or a boring tool.

Template 14 includes at least one hole 18 and at least one locating pin 20. Hole 18 may be circular or other geometries as required by workpiece 16 machining area 64 form, fit, function and/or design. Locating pin 20 is shown having an hourglass shape with annular ring 60 proximate to locating pin 20 center; alternatively, locating pin 20 may have other shapes such as T shaped or the shape of an inverted L. For each hole 18 in template 14 there is at least one locating pin 20 mounted proximate thereto.

Fixation device 10 (FIG. 2) generally includes housing 22, seat 24 and clamping mechanism 26. Seat 24 is disposed on housing tool end 28 of housing 22. Seat 24 interfaces between rotating machine tool 12 and housing 22 and provides mounting for rotating machine tool 12.

Clamping mechanism 26 includes piston 32, clamping actuator 40, unclamping actuator 52, ball holders 54, pressure cylinders 56 and releasable balls 58. Piston 32 is located within housing 22 and includes piston flange 34 on piston actuating end 36. Clamping actuator 40, shown in FIG. 2 as a resilient member or spring, normally forces piston 32 towards housing template end 30 by acting upon piston flange 34.

Air coupling 42 connects pressure dispersion area 44 to a source of compressed gas (not shown). Piston seal 46 and first seal 48 in conjunction with piston 32 and housing 22, when connected to a source of compressed gas through air coupling 42, allow a positive pressure (with respect to atmospheric pressure) to build in pressure dispersion area 44, and this positive pressure acts on piston flange 34 and counteracts the force of clamping actuator 40. Air evacuation hole 50 in housing 22 is operatively coupled to pressure dispersion area 44 to ensure that the positive pressure does not bind piston 32 against housing 22. In one embodiment, pressure dispersion area 44 is defined by the space bounded by piston 32, housing 22, piston seal 46 and first seal 48.

In the absence of a sufficient positive pressure in pressure dispersion area 44, clamping actuator 40 will force piston 32 towards housing template end 30. When so actuated, pressure cylinders 56 connected to piston clamping end 38, supported by ball holders 54 and disposed at least partially at the housing template end 30, engage locating pins 20 of template 14 by pushing releasable boll balls 58 into annular ring 60 of a respective locating pin 20. Fixation device 10 is thus clamped to template 14.

Unclamping actuator 52 is a pneumatic system having air coupling 42 operatively coupled to pressure dispersion area 44 and an air evacuation hole 50 in housing 22 coupled to pressure dispersion area 44. To unclamp fixation device 10 from template 14 compressed gas is introduced at air coupling 42 creating a positive pressure in pressure dispersion area 44. This positive pressure acts on piston flange 34 and counteracts the force of clamping actuator 40, allowing piston 32 to disengage releasable ball 58 from annular ring 60. Fixation device 10 may then be moved from template 14.

Exhaust system 62 can be optionally provided to remove debris from machining area 64. Exhaust system 62 includes bellows 66 located at housing template end 30, vacuum exhaust 68 interposed between piston 32 and housing tool end 28, and second seal 70 between piston 32 and vacuum exhaust 68. After clamping fixation device 10 to template 14, bellows 66 seals machining area 64. Attaching a vacuum source (not shown) to vacuum exhaust 68 removes debris from machining area 64.

To operate fixation device 10 during a machining operation, template 14 is positioned on workpiece 16, and fixed in place, if necessary, by common elements known in the art such as a C clamp. Fixation device 10 is then located proximate to at least one hole 18 and at least one locating pin 20 and clamped to template 14 by disconnecting a source of compressed gas at air coupling 42 or disconnection of the source of compressed gas at air coupling 42 by other common elements such as a switch. Disconnection of the source of compressed gas will simultaneously disable unclamping actuator 52 and enable clamping actuator 40 thus clamping fixation device 10 to template 14. Rotating machine tool 12 is mounted on seat 24 and through housing 22 and hole 18 to engage and machine workpiece 16 at machining area 64.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fixation device for positioning a rotating machine tool onto a template, the template having at least one hole and two locating pin, attached to and projecting from the temp late proximate to each said at least one hole, said fixation device comprising:

a housing with a housing tool end and a housing template end;

a seat located on said housing tool end for cowling with the rotating machine tool; and a clamping mechanism mounted to said housing for coupling said housing template end with each of said two locating pins, said clamping mechanism including a piston located within said housing, said piston having a piston actuating end and a piston clamping end, a clamping actuator coupling said piston actuating end and said housing tool end, an unclamping actuator pneumatically coupling maid piston actuating end and said housing tool end, two bail holders attached to the housing template end, each said ball holder being configured to concentrically circumscribe a respective one of said two locating pins, two pressure cylinders disposed on said piston clamping end, each said pressure cylinder being concentrically connected to a respective one of said two ball holders, and at least one releasable bail located in each said ball holder, each said locating pin including an annular groove in which said at least one releasable ball engages during actuation of said clamping actuator and disengages during actuation of said unclamping actuator.

2. The fixation device of claim 1, wherein the two locating pins are disposed diametrically opposed relative to a respective said at least one hole.

3. The fixation device of claim 1, wherein said clamping actuator includes a resilient member in a form of a compression spring.

4. The fixation device of claim 1, wherein said unclamping actuator is a pneumatic system.

* * * * *

UNITED STATES PATENT AND TRADEMARK OFFICE
CERTIFICATE OF CORRECTION

| | |
|---|---|
| PATENT NO. | : 6,902,361 B2 |
| APPLICATION NO. | : 10/172541 |
| DATED | : June 7, 2005 |
| INVENTOR(S) | : Pettersson et al. |

It is certified that error appears in the above-identified patent and that said Letters Patent is hereby corrected as shown below:

COLUMN 4
    At line 23, delete "boll".

COLUMN 5
    At line 7, delete "pin", and substitute therefore --pins--;
    At lines 7 and 8, delete "temp late", and substitute therefore --template--;
    At line 12, delete "cowling", and substitute therefore --coupling--; and
    At line 21, delete "maid", and substitute therefore --said--.

COLUMN 6
    At line 1, delete "bail", and substitute therefore --ball--;and
    At line 8, delete "bail", and substitute therefore --ball--.

Signed and Sealed this

Twenty-fourth Day of April, 2007

JON W. DUDAS
*Director of the United States Patent and Trademark Office*